United States Patent
Chen

(10) Patent No.: US 6,184,779 B1
(45) Date of Patent: Feb. 6, 2001

(54) VEHICLE SECURITY SYSTEM HAVING WIRELESS FUNCTION-PROGRAMMING CAPABILITY

(75) Inventor: Chau-Ho Chen, Taipei (TW)

(73) Assignee: Directed Electronics Inc., Vista, CA (US)

( * ) Notice: Under 35 U.S.C. 154(b), the term of this patent shall be extended for 0 days.

(21) Appl. No.: 08/790,954

(22) Filed: Jan. 29, 1997

(51) Int. Cl.$^7$ ..................................................... B60Q 1/00
(52) U.S. Cl. ...................... 340/425.5; 340/426; 307/10.2
(58) Field of Search ............................... 340/425.5, 426, 340/428, 429, 430, 825.31, 825.32, 825.69, 825.72; 307/10.2, 10.4, 10.5; 180/167

(56) References Cited

U.S. PATENT DOCUMENTS

| | | | |
|---|---|---|---|
| 3,899,772 | * 8/1975 | Mead et al. | 340/825.55 |
| 4,656,463 | * 4/1987 | Anders et al. | 340/572 |
| 4,794,368 | * 12/1988 | Grossheim | 340/426 |
| 5,007,050 | * 4/1991 | Kasparian et al. | 370/77 |
| 5,025,253 | * 6/1991 | DiLullo et al. | 340/991 |
| 5,113,182 | * 5/1992 | Suman et al. | 340/426 |
| 5,146,215 | * 9/1992 | Drori | 340/825.32 |
| 5,157,375 | * 10/1992 | Drori | 340/429 |
| 5,185,697 | * 2/1993 | Jacobs et al. | 364/419 |
| 5,189,412 | * 2/1993 | Mehta et al. | 340/825.22 |
| 5,278,547 | * 1/1994 | Suman et al. | 340/426 |
| 5,467,070 | * 11/1995 | Drori et al. | 340/425.5 |
| 5,477,214 | * 12/1995 | Bartel | 340/825.31 |
| 5,479,157 | * 12/1995 | Suman et al. | 340/825.31 |
| 5,534,845 | * 7/1996 | Issa et al. | 340/425.5 |
| 5,543,778 | * 8/1996 | Stouffer | 340/425.5 |
| 5,550,551 | * 8/1996 | Alesio | 342/457 |
| 5,559,493 | * 9/1996 | Karnwie-Tuah | 340/426 |
| 5,572,185 | 11/1996 | Chen | 340/425.5 |
| 5,650,774 | * 7/1997 | Drori | 340/825.32 |

* cited by examiner

Primary Examiner—Van T. Trieu

(57) ABSTRACT

A vehicle security system for performing selectable vehicle security functions that are programmable in a wireless manner. The system has a microcontroller controlling a vehicle security interface including at least a siren control unit and a vehicle head/signal light controlling unit. A physically independent remote programming unit is used for transmitting function-programming information to the microcontroller, and a radio receiver is connected to the microcontroller for receiving function-programming information transmitted by the remote programming unit. The remote programming unit includes a switch array for setting up a security function code pattern representing the selected security functions. The remote programming unit also includes a radio transmitter for sending, in an electromagnetic transmission, the function-programming command in a signal string representing the security function code pattern to the microcontroller. The microcontroller stores, in an onboard memory, data identifying the security functions conveyed in a security function code pattern received from the remote programming unit. The programmed functions control the various vehicle security function units. The security system provides an easy function-programming capability without having to remove any system components from the vehicle and without having to use any special and expensive additional equipment.

20 Claims, 8 Drawing Sheets

VEHICLE SECURITY SYSTEM HAVING WIRELESS FUNCTION-PROGRAMMING CAPABILITY

TECHNICAL FIELD

This invention relates in general to a vehicle security system and in particular to a security system capable of having its functions wirelessly programmed without removing any of its components from a vehicle.

BACKGROUND ART

Security systems are becoming essential for passenger vehicles, in particular, family sedans and vans, which constitute costly possessions for ordinary families and small businesses. A typical vehicle security system is incorporated as part of the electronic system of a vehicle and provides a selection of security functions such as intrusion alarm arming and automatic door locking and can also provide convenience functions such as vehicle locating in a crowded parking lot.

Vehicle security systems are generally classified as being either active arming system or passive arming systems. For passive arming, there are systems with or without a door-locking function, systems with or without an arming/disarming chirp, and so on. Similar functional varieties can also be found for active arming systems. Whatever the category, all these functions of a vehicle security system must be programmable to satisfy different user requirements. For example, a user of a vehicle security system living in an apartment may want to turn off the arming/disarming chirp, or at least reduce the sound level of the chirp, if he or she is late coming home. On the other hand, the sensitivity of the intrusion alarming function may need to be reduced on windy days.

As a self-contained electronic system, any such vehicle security system relies on a user decision concerning which ones of all the provided security functions to enable and which to disable. Further, some of the function parameters, such as the chirp sound level mentioned above, would have to be set to a level suitable for the environment in which the system is operated. Thus, when attempting to set up, or program, the functions of a vehicle security system, human interface design for the interaction between the security device and the user becomes an important factor for the convenient, successful and efficient use of the security device.

For the purpose of describing the invention, several typical prior-art vehicle security systems are briefly examined in the following paragraphs with reference to the accompanying drawings. Among the examined security systems, FIG. 1 is a block diagram illustrating the circuit configuration of one system that employs a dual in-line package (DIP) switch array for programming the security functions. The systems of FIGS. 2 and 3 have basically the same circuit configuration, although they employ different function-programming methodologies.

As can be observed in FIG. 1, the typical vehicle security system is built around a microcontroller 30 to provide all its security functions for a vehicle. Specifically, in addition to the governing microcontroller 30, the depicted system can be constructed to include subsystems such as a power door-lock 31, a starter interrupt 32, at least one LED 33, a siren 34, a vehicle light signaling control 35, and an auxiliary output 36. All these subsystems are controlled by the microcontroller 30 for facilitating all the control and status, indicating purposes involved in the security functional operations of the system.

For example, the LED array 33 is typically a subsystem installed on the dashboard to display different lighting patterns indicating to the user (the driver of the vehicle) information concerning the security system status. Additionally, if a security violation event is triggered from outside the vehicle after the security system is armed, subsystems siren control 34 and vehicle light signaling control 35 can be activated in different sounding schemes and head/signal light lighting patterns respectively. These sound and light signals warn about the attempted or achieved intrusion into the guarded vehicle. Further, the auxiliary output 36 can be used to initiate, for example, a radio transmitting device on board the vehicle which can send predefined signal patterns for use in determining the location of the vehicle.

The system outlined in the block diagram of FIG. 1 further includes the ignition switch status indicator 21, the valet/override switch 22, the DIP switch array 23 and a radio receiver 10. The ignition switch status relayed from the indicator 21 is used by the microcontroller 30 to determine the operating state of the entire security system. For example, if the ignition switch of the vehicle is in the normal ON position, and the vehicle is coasting along a road, the security system should then ignore some of its sensing inputs such as the vehicle body vibrating sensor input.

The radio receiver 10 is used as part of a wireless link over which is communicated vehicle operator instructions to the vehicle security system. On most occasions, the wireless link is established via electromagnetic signals transmitted from a radio transmitter 12 included in a remote control unit of the vehicle security system. This remote control unit is normally carried by the owner of the vehicle with, for example, a main ignition switch key of the vehicle.

The DIP switch array 23 in FIG. 1, as well as its counterparts in FIGS. 2 and 3, serves to provide a means for the programming of all the security functions for the vehicle. One of the conventional programming methods employed for setting up functions provided by a vehicle security system is via setting the ON/OFF states of switches in such a DIP switch array. This DIP switch array is normally installed on the electronic printed circuit board (PCB) of the security device. In a block diagram, FIG. 1 schematically illustrates one such system employing this programming scheme. Access to the system circuit module is necessary, and not only when the vehicle security system is used for the first time. Subsequent function adjustment or security device reprogramming also requires the direct access of the DIP switch array. This commonly requires removing the security system module from the vehicle to gain access to the DIP switch array. The circuit module must be opened and the DIP switches exposed to a service technician, or the user, to perform the function adjustment and/or the reprogramming.

Since vehicle security systems are designed to provide ever more complicated functions, using DIP switches to set up even some, if not all, of these security functions has become a task that cannot be considered easy and straightforward. Adjustment setting in a large array of DIP switches is not an easy task, as each individual switch has to be identified before a setting can be made. Such jobs normally have to be performed by trained service personnel. Meanwhile, if DIP switches are to be used for function setting, for security systems with complicated functions, a large number of DIP switches must be used. As a result, system PCB's have to provide board space for these DIP switches. The cost of this increased PCB size adds to the already added cost of the DIP switches themselves, increasing the cost of the vehicle security system hardware.

FIG. 2 illustrates the construction of a vehicle security system wherein a limited number of programming control switches and a wireless transmission are used for programming the security functions. The scheme is to employ a smallest possible number of electrical switches to facilitate the security system function adjustment and/or reprogramming in a step-by-step procedure. This is a method designed to circumvent the necessity of using a large array of switches for the setting of every individual function provided by the vehicle security device.

Normally, by setting the vehicle security system of FIG. 2 to its program mode by properly setting the program switch 24, a user can program all the functions by pressing a small number of control switches on a remote control unit. The remote control unit used for such programming is frequently the unit used for the normal operation of the security system. The design of the entire vehicle security system allows the normal remote control unit to become the programming unit automatically when the system module is set to the program mode.

Essentially, this is a step-by-step scheme in which all the function-setting options are sequenced for user selection and setting. A user has the opportunity to set each and every function of the security system as he or she steps through the entire cycle. One obvious disadvantage of this scheme, however, is that the user frequently misses a step. Frequently, it is forgotten which step is associated with a particular function to be set or adjusted. Sometimes, even when the step counting is correct, a function whose setting has been passed is desired to be altered. The entire stepping cycle will then have to be sequenced again. Although relatively simple hardware can be set up to implement such a straightforward rotating function-setting scheme, such a scheme does not meet today's user-friendliness standard.

Still another conventionally known vehicle security system function-programming scheme involves the use of a controlling host computer. The host computer used may be, for example, a popular IBM-compatible PC, which is coupled via a suitable electronic interface to the vehicle security system for implementing the functions setting. This has the advantage of user-friendliness since a graphic user interface (GUI) can be adopted for human interface. FIG. 3 shows an example of such an arrangement for implementing this host-programming scheme.

The block diagram illustrated in FIG. 3 incorporates a host computer system that serves to control the function-programming procedure in a security system via interface through the programming interface electronics 25. Although this scheme provides better flexibility in the process of function selection and setting, a direct connection of the circuit module to a host computer is necessary. Before the connection to the host computer is made, the circuit module of the vehicle security system has to be removed from the vehicle and taken to the location where the host computer resides. On most occasions, only vehicle service shops have the necessary interface between the host computer and the vehicle security system. As a result, the convenience of programming interface is not directly accessible to the end user, that is, the owner of the vehicle.

DISCLOSURE OF THE INVENTION

An object of the present invention is to provide a vehicle security system having a wireless function-programming capability that is easy to use in implementing the programming.

Another object of the present invention is to provide a vehicle security system having a wireless function-programming capability that does not require the removal of any of the system's components from the vehicle to implement the programming.

Still another object of the present invention is to provide a vehicle security system having a wireless function-programming capability that does not require the use of additional costly equipment to implement the programming.

Yet another object of the present invention is to provide a vehicle security system having a wireless function-programming capability that is low in cost.

The present invention achieves these and other objects by providing a vehicle security system for performing selectable vehicle security functions that are programmable in a wireless manner. The system has a base microcontroller for controlling a vehicle security interface, which includes an auditory alarm device, preferably a siren control unit and siren, and a vehicle head/signal light control unit. A physically independent remote programming unit is used for transmitting function-programming information to the base microcontroller, and a radio receiver is connected to the base microcontroller for receiving wireless function-programming information transmitted by the remote programming unit. The remote programming unit includes a DIP switch array for setting up a security function code pattern representing selected security functions. The remote programming unit also includes a radio transmitter for sending, in a wireless transmission, the function-programming commands in a signal string representing the security function code pattern to the base microcontroller. The base microcontroller stores, in an onboard memory (not shown), data identifying the security functions specified by the security function code pattern received from the remote programming unit. The base microcontroller controls vehicle security functions according to the data stored in the onboard memory.

The present invention further achieves these objects by providing a method of wireless function-programming for setting a plurality of security functions in a vehicle security system. The vehicle security system has a base microcontroller for controlling a number of various vehicle security function units, a remote programming unit for transmitting function-programming information to the base microcontroller, and a radio receiver for receiving function-programming information transmitted by the remote programming unit. The method includes the steps of setting up a security function code pattern representing the selected security functions in the remote programming unit. The remote programming unit then sends, in a wireless transmission, a function-programming command in a signal string representing the security function code pattern to the base microcontroller. The security functions specified by the security function code pattern received from the remote-programming unit are then programmed into the base microcontroller for controlling the various vehicle security function units.

The objects of the present invention are readily apparent from the following detailed description of the best mode for carrying out the invention when taken in connection with the accompanying drawings.

BRIEF DESCRIPTION OF THE DRAWINGS

A more complete appreciation of the invention and many of the attendant advantages thereof may be readily obtained by reference to the following detailed description when considered with the accompanying drawings in which like reference characters indicate corresponding parts in all the views, wherein.

BEST MODE FOR CARRYING OUT THE INVENTION

Figure 1:
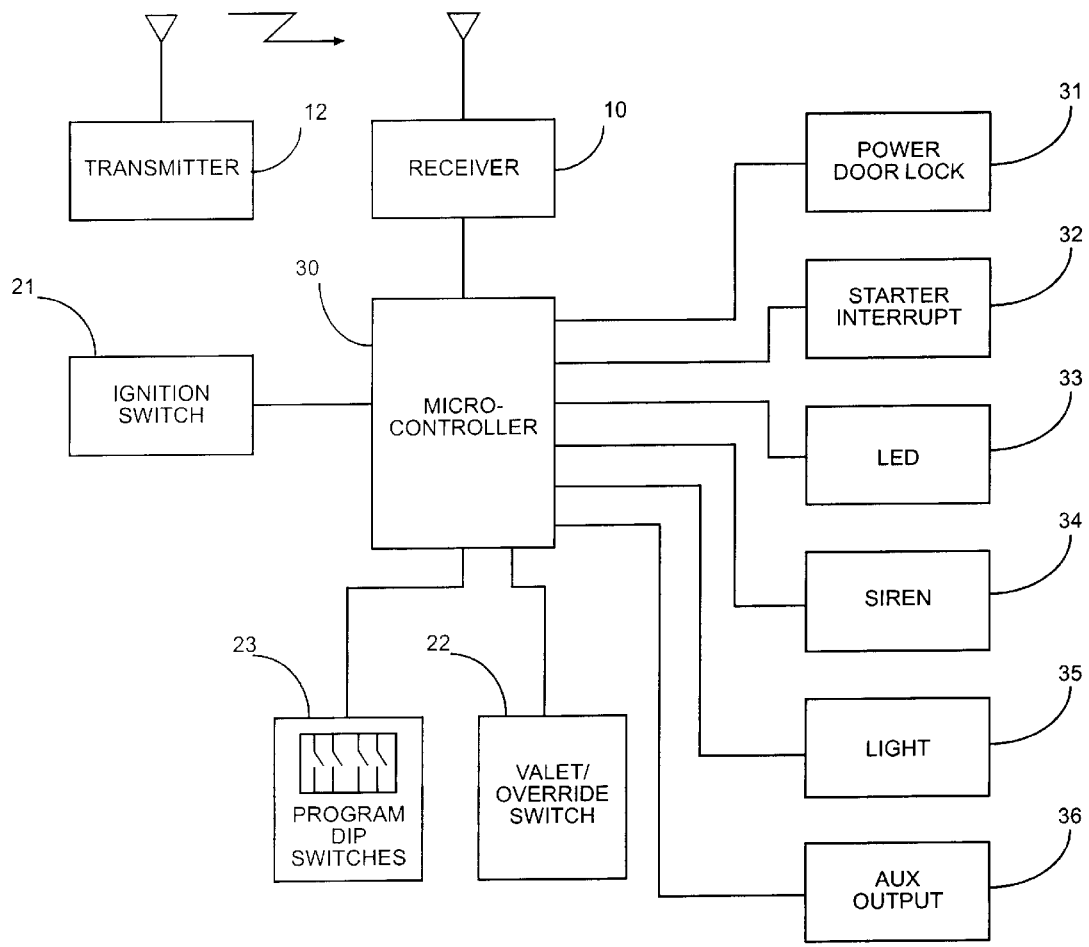
FIG. 1 is a block diagram illustrating the circuit configuration of a conventional vehicle security system employing a DIP switch array for programming the security functions thereof.
Figure 2:
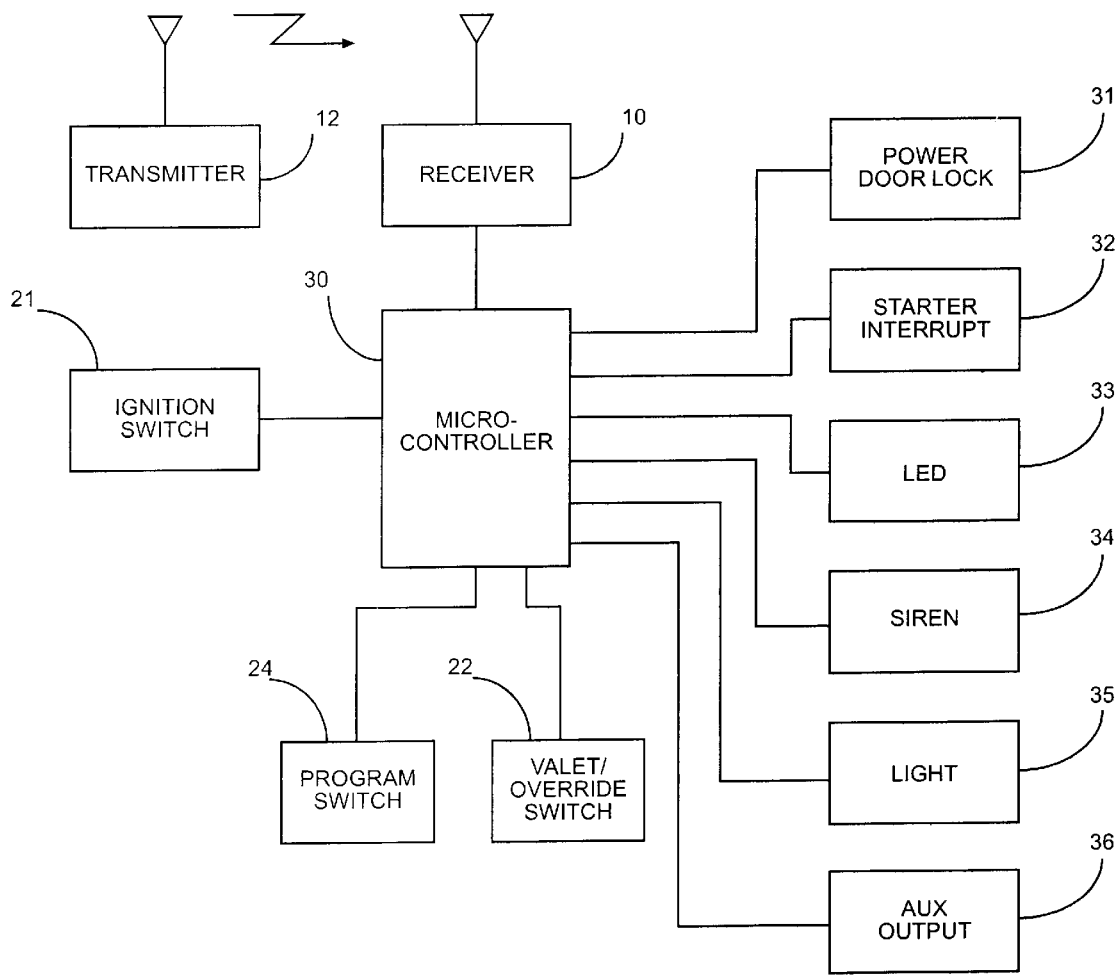
FIG. 2 is a block diagram illustrating the circuit configuration of another conventional vehicle security system employing a step-by-step rotating scheme for programming the security functions thereof.
Figure 3:
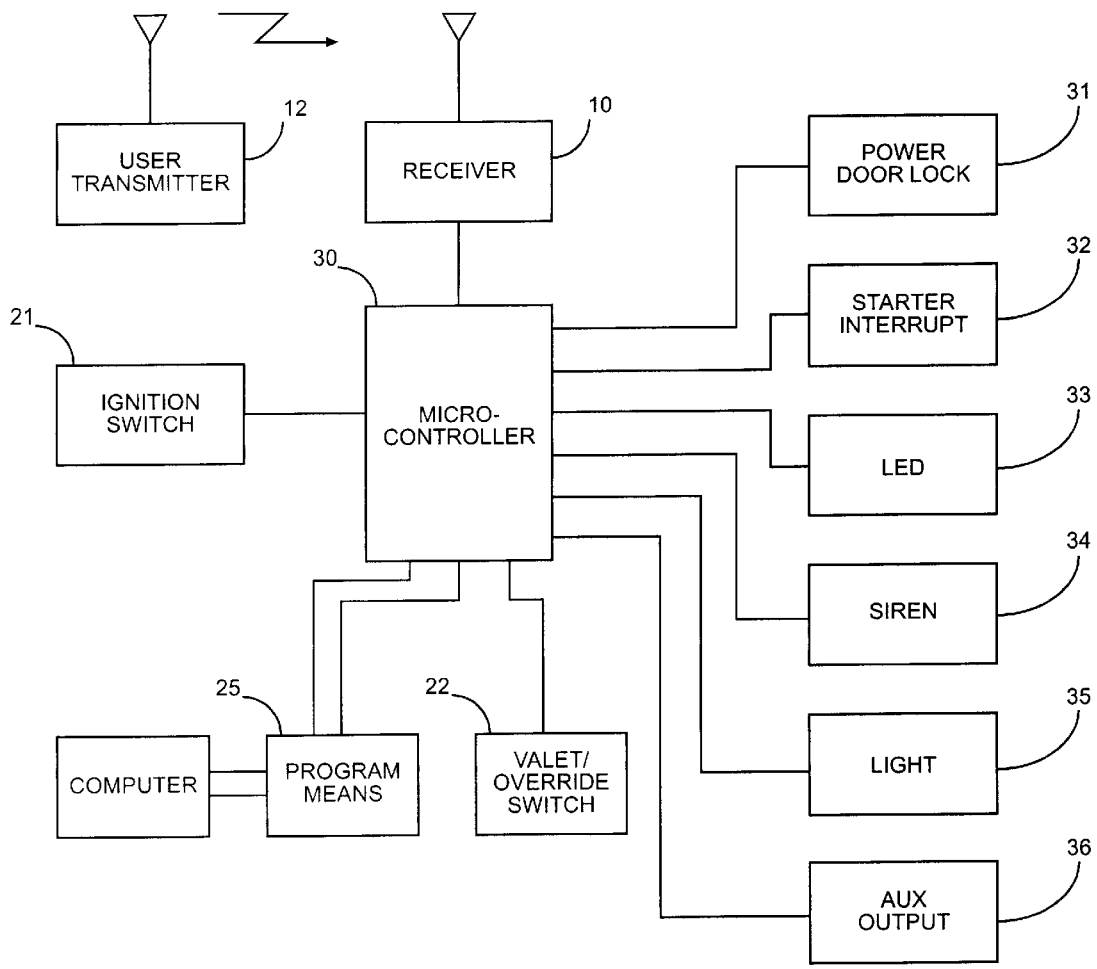
FIG. 3 is a block diagram illustrating the circuit configuration of still another conventional vehicle security system employing a host computer system for controlling the programming of the security functions thereof.
Figure 4:
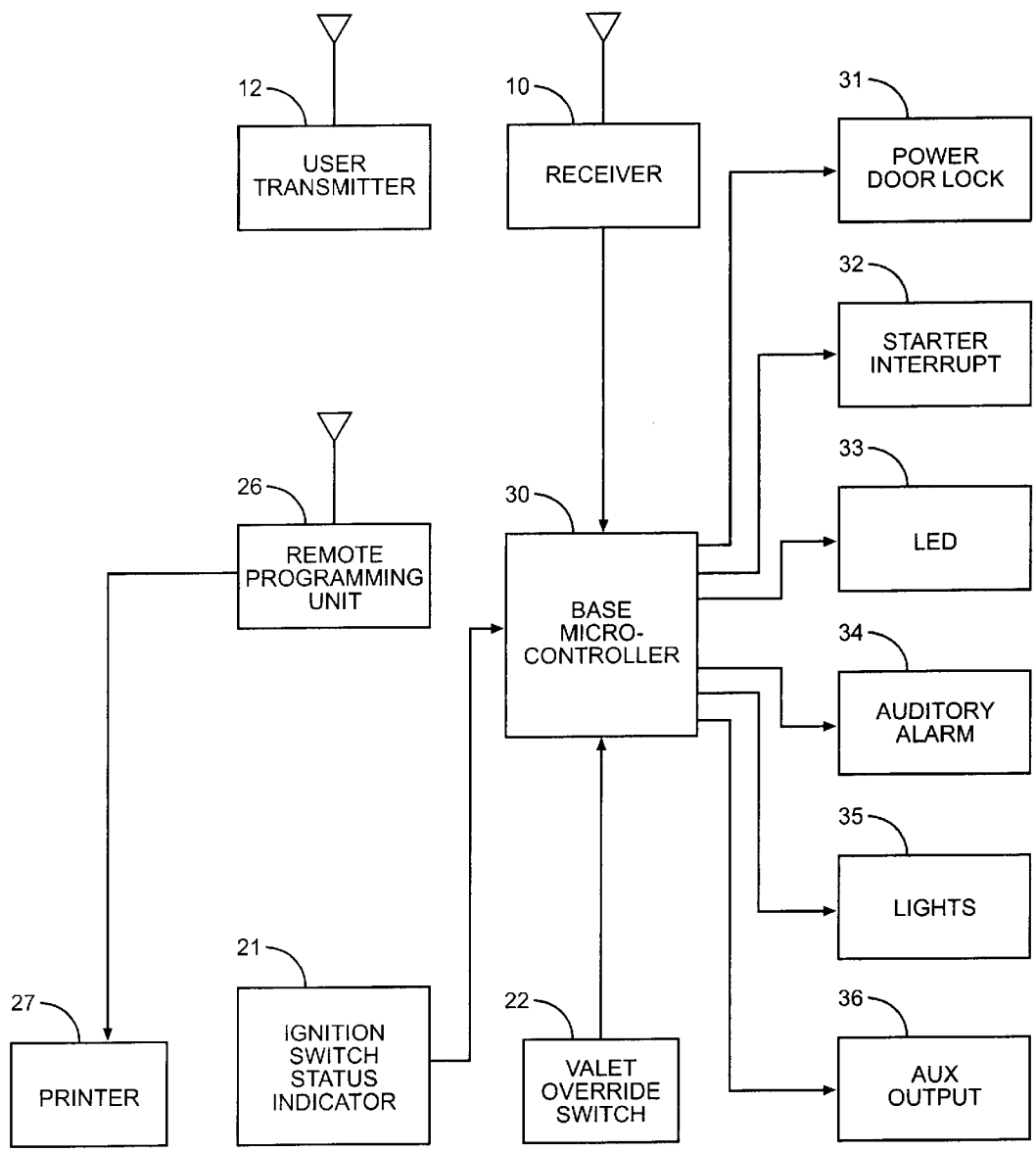
FIG. 4 is a block diagram illustrating the circuit configuration of a vehicle security system that employs wireless function-programming in accordance with a preferred embodiment of the invention.

For a description of the wireless function-programming vehicle security system of the present invention, preferred embodiments are depicted in the following paragraphs with reference to the accompanying drawings. FIG. 4 illustrates a block diagram outlining the circuit configuration of a vehicle security system that employs a wireless function-programming system in accordance with a preferred embodiment of the invention.

As is shown in the drawing, the inventive vehicle security system is based on a base controller, preferably a microcontroller 30, that controls all security functions for a vehicle. In addition to the governing base microcontroller 30, the depicted system includes a power door-lock unit 31, a starter interrupt 32 to prevent the vehicle from being started, at least one light-emitting diode (LED) 33, an auditory alarm, preferably a siren, 34, a vehicle light signaling control 35, and an auxiliary output 36.

Subsystems 31 through 36 are used for facilitating all the control and status-indicating purposes involved in the security function operations in the vehicle security system. The LED 33 is typically installed on a vehicle dashboard and displays different lighting patterns indicating to the driver of the vehicle information concerning the system status. In case of a security violation event triggered from outside the vehicle after the system is armed, the siren 34 can be activated in different warning sound schemes, and the vehicle head lights, as well as the signal lights, can be controlled to turn on and off in different signaling patterns. Either the siren sound or the light, or both, can be used to warn of an attempted or achieved intrusion into the guarded vehicle. The auxiliary output 36, additionally provides a means to initiate, for example, a radio transmitter, onboard the vehicle, which can send predefined radio signals for use in determining the location of the vehicle if, for example, it is stolen.

The inventive system outlined in FIG. 4 further includes an ignition switch status indicator 21, a valet/override switch 22, a radio receiver 10, and a remote programming unit 26. Ignition switch status relayed from the indicator 21 is used by the base microcontroller 30 to determine the operating state of the entire security system. When the ignition switch of the vehicle is in the normal ON position and the vehicle is being driven along a road, a status signal from the indicator 21 allows the security system to properly control the entire security system. For example, the system may be instructed to ignore some of its sensing inputs such as a vehicle body vibrating sensor input, since the vehicle is being driven.

The remote programming unit 26 in the system is used to provide a means for programming all the security functions of the vehicle in a manner convenient and efficient for the user and to be described in detail in the following paragraphs. Essentially, the remote programming unit 26 includes a radio transmitter (not explicitly shown in the block diagram but shown in detail in FIG. 5) for implementing the remote programming. The radio receiver 10 is used to complete a wireless link to communicate the vehicle operator instructions to the vehicle security system. The operator instructions in this inventive system include those for normal operation of the security system as well as those for programming the security functions.

On most occasions, a wireless link is established via electromagnetic signals transmitted from a user radio transmitter 12 included in a remote control unit for the normal operation of the vehicle security system. This remote control unit is normally carried by the owner of the vehicle with, for example, the main ignition switch key of the vehicle. For a function-programming operation of the security system, however, a remote control unit other than the one containing the user radio transmitter 12 for normal system operation can be provided, as is the situation depicted in FIG. 4. The same radio receiver 10 used for receiving commands of the normal operations sent by the user radio transmitter 12 is also used to receive programming commands issued by the remote programming unit 26. However, as persons skilled in the art should well appreciate, a radio receiver unit other than the radio receiver 10 can be used to receive function-programming instructions coming from the remote programming unit 26. Or the same user radio transmitter 12 can be used to relay function-programming instructions to the base microcontroller 30 of the system. Also, the wireless transmission link between the remote programming unit 26 and the base microcontroller 30 may use electromagnetic signals that are in the infrared range of frequencies and which serve the same purposes.

Also included in the embodiment of FIG. 4 is a printer 27 connected to the remote programming unit 26. As will be described in further detail in the following paragraphs, this printer 27 can be used as a means to record the setting of the security functions.

Figure 5:
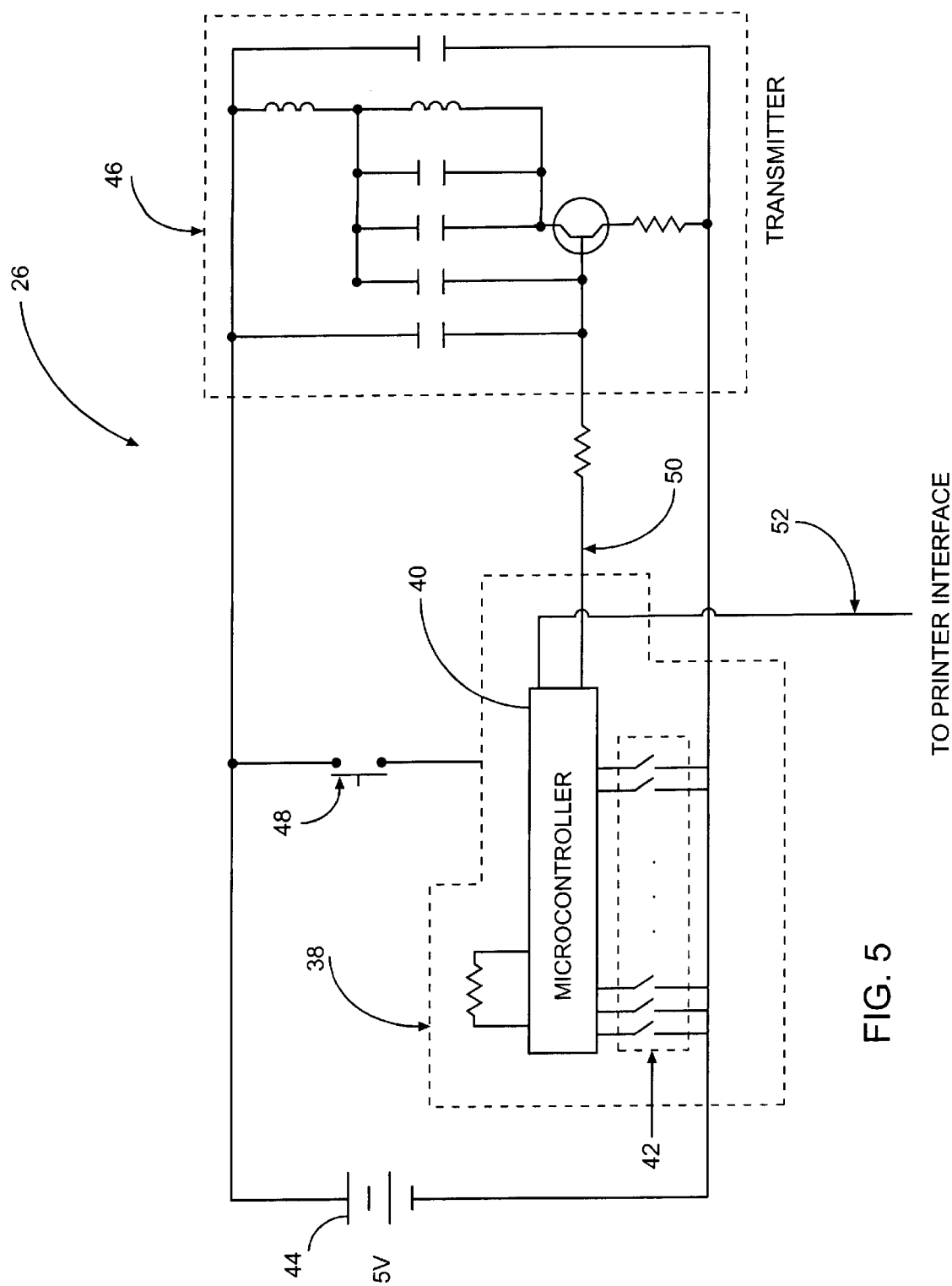
FIG. 5 is a schematic diagram illustrating a preferred embodiment of the electronic circuits for the remote programming unit used in the vehicle security system of FIG. 4.

FIG. 5 is a schematic diagram illustrating the circuit embodiment of the remote programming unit, generally indicated by reference numeral 26, used in the vehicle security system of FIG. 4. As is shown in FIG. 5, the depicted embodiment of the remote programming unit 26 typically includes a radio transmitter 46 and a microcontroller-based function-setting control circuit 38, both being identified by phantom lines in the drawing.

The microcontroller-based function-setting control circuit 38 includes a remote controller, preferably a microcontroller 40, and an array of electric switches, preferably DIP switches 42. The status of each of the individual switches in the array 42 is directly monitored by the remote microcontroller 40. A combination of switch ON/OFF states in the entire DIP switch array 42 can be used to program the corresponding security functions of the system.

In the described embodiment of the remote programming unit 26 depicted in FIG. 5, a battery 44 having, for example, a 5-volt supply voltage, is used to provide power to both the radio transmitter 46 and the microcontroller-based function-setting control circuit 38. A program-initiation switch, which can be a normally open contact switch 48 connecting the power supply line of the remote microcontroller 40 to the battery 44, can be used to initiate a function-programming operation in the vehicle security system.

To proceed with the security function-programming operation in the security system, the desired functions must be set up in advance by setting each of the switches in the switch array 42 to its corresponding ON/OFF position. With the functions set-up complete in the switch array 42, pressing the contact switch 48 supplies power to the remote microcontroller 40. While the contact switch 48 is closed, the remote microcontroller 40 is first initiated; and a firmware routine residing inside the onboard memory of the base microcontroller executes the transmission of function-setting command strings via a connection path 50 to the radio transmitter 46. Thus, the function-programming command strings can be transmitted as radio signals by the radio transmitter 46.

Further, a signal line 52 output by the remote microcontroller 40 allows the function-programming information to be sent also to a recording device such as a printer 27 for logging purposes. This information can be relayed to the printer 27 at, or not at, the same time the transmission of programming information is underway. However, as persons skilled in the art should appreciate, for a simplest possibly system, the printer record can be printed at the same time the function-programming transmission is made, that is, if a printer is present at the other end of the signal line 52. As should also be readily understood, the interface to the printer device can be via any of the popular standards, such as RS-232C.

Figure 6:
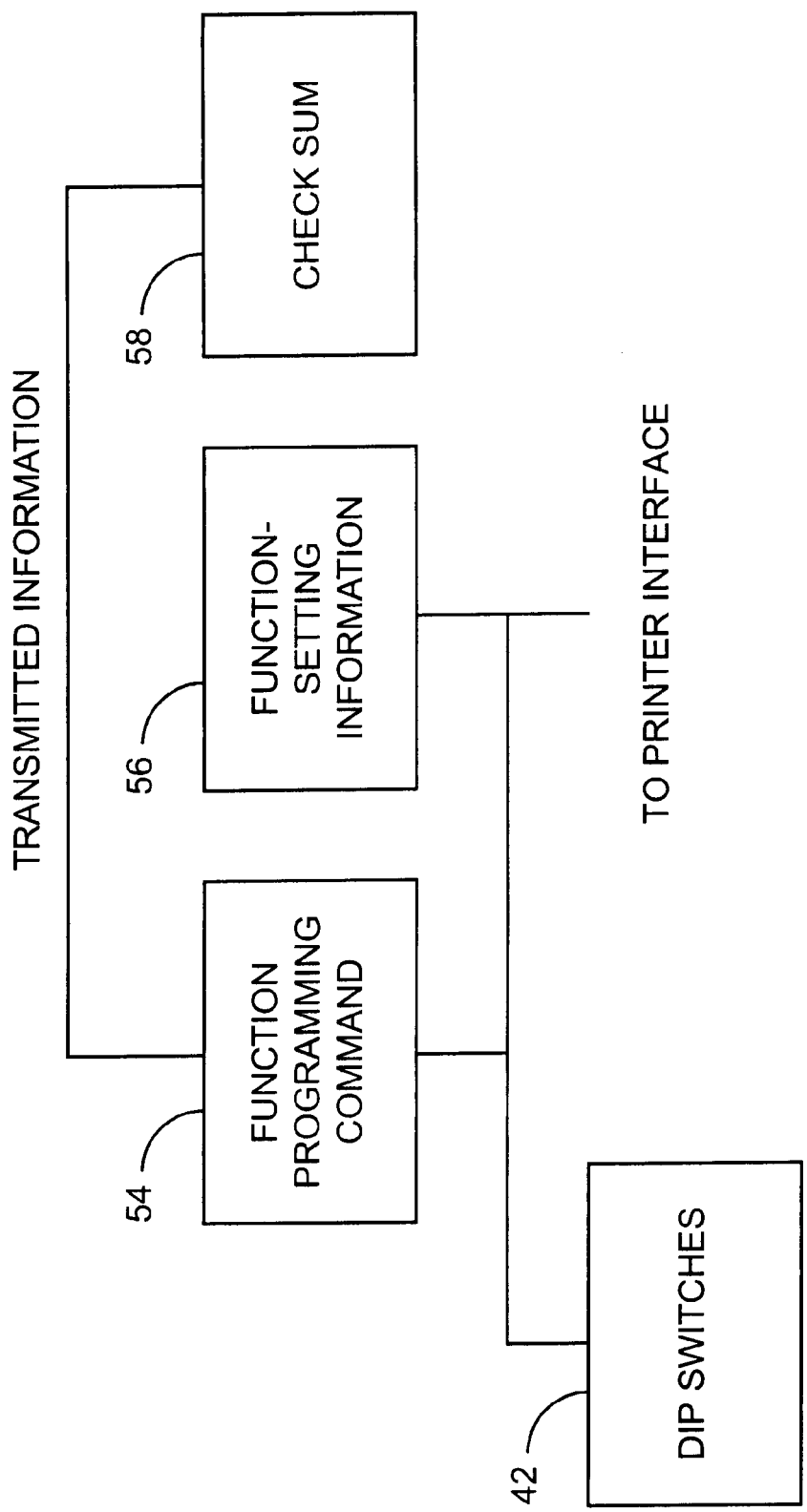
FIG. 6 is a schematic diagram outlining the format of a wireless signal transmitted by the remote programming unit of the vehicle security system of FIG. 4.

FIG. 6 schematically outlines the format of an electromagnetic signal as transmitted by the remote programming unit 26 of FIG. 4. The transmitted information for the execution of the function-programming operation in the vehicle security system as outlined in FIG. 6 may be from a function-programming command section 54, a function-setting information section 56, and a check-sum section 58. As persons skilled in the art should be aware, transmission of the three information sections in the transmitted electromagnetic signal can be arranged in any order. The essential requirement is that the base microcontroller 30 in the vehicle security system has a corresponding scheme to decode its received information.

Figure 7:
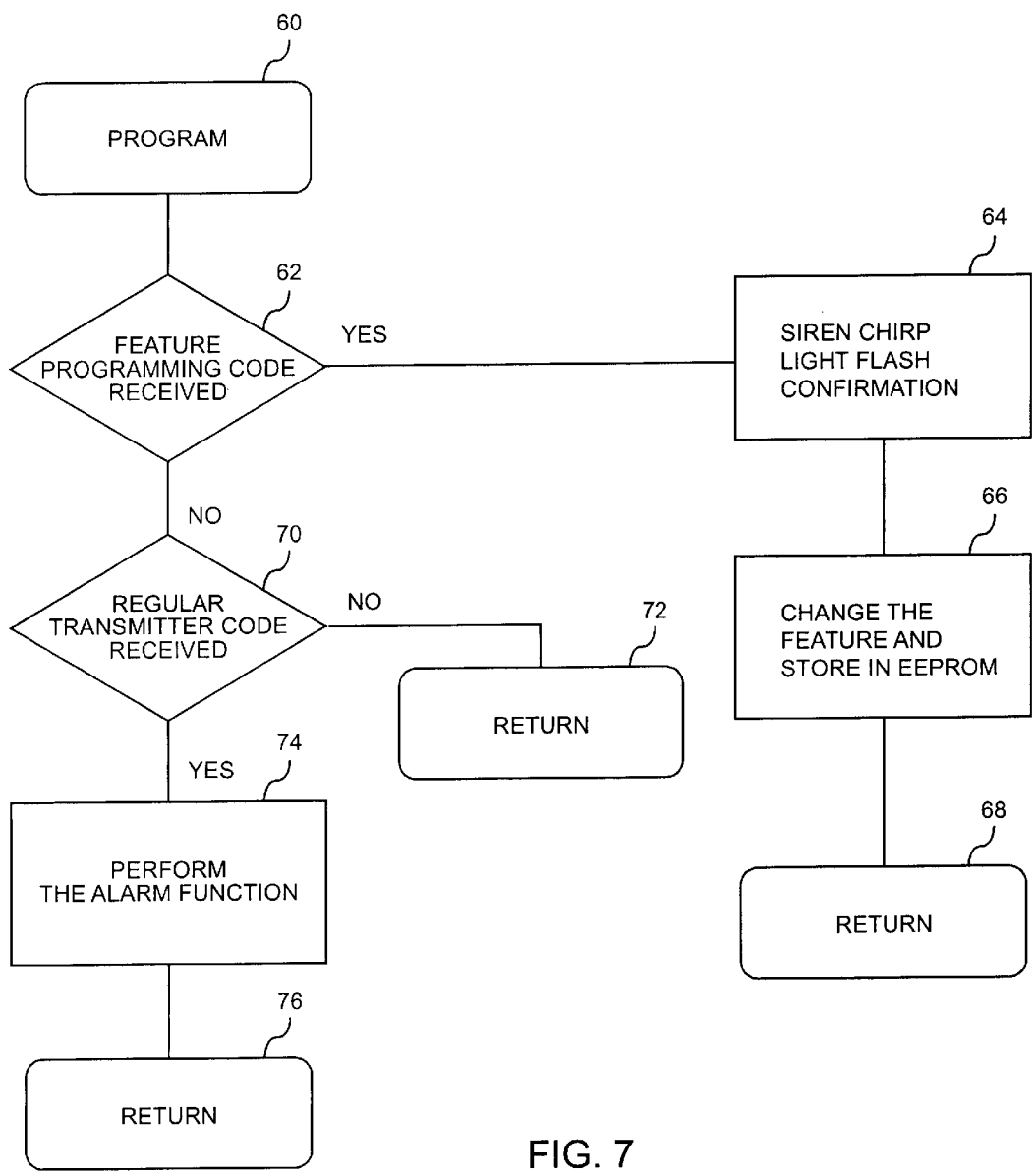
FIG. 7 is a flow diagram illustrating a main system firmware routine, executed by the base microcontroller, of the vehicle security system depicted in FIG. 4.
Figure 8:
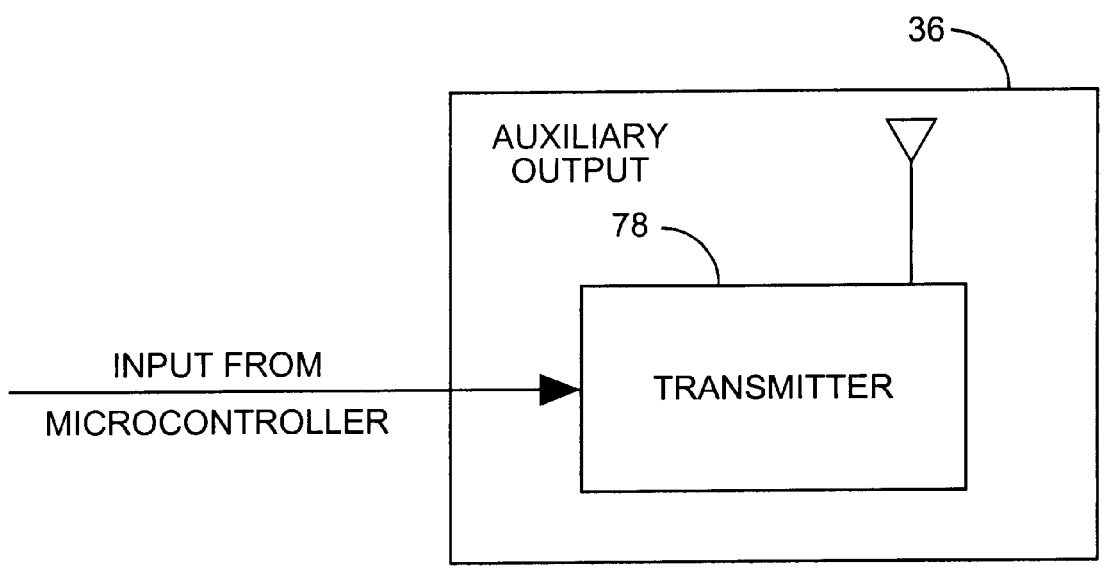
FIG. 8 is a diagram illustrating the auxiliary output unit as a transmitter, controlled by the microcontroller.

FIG. 7 is a flow diagram illustrating a main system firmware routine employed by the base microcontroller 30 of the vehicle security system depicted in FIG. 4. This exemplified main system firmware routine is responsible for monitoring the activities in the vehicle security system as intended by the user of the vehicle, as well as by environmental events. Essentially, the firmware program can be a recursive routine, starting from the program start step, concluding at a program return step, and then recycling.

For example, the base microcontroller 30 of the system of FIG. 4 starts the firmware routine of FIG. 7 at the start step 60. At step 62, the system determines whether or not a function-programming request code is received. If the system is requested by the user to implement a function-programming operation, the routine continues at step 64, where the siren can be driven to sound predetermined chirps; and the vehicle lights may also be flashed in predetermined patterns. This signals to the user of the system that the system acknowledges the programming request and is responding accordingly.

At a subsequent step 66, the vehicle security system is substantially programmed based on the received information. The new function settings are effectively stored in the system memory, which may be, for example, electrically erasable-programmable read-only memory (EEPROM) devices. With the conclusion of the actual reprogramming of the system, the routine has concluded one program cycle, as indicated by step 68, and program control is returned to step 60 for another cycle of system monitoring operation.

On the other hand, upon determining that the system is not requested by the user to perform function reprogramming at step 62, which is a situation of normal system monitoring operation, the routine continues at step 70. At step 70, another decision is made to determine if a security event has occurred. If there is no abnormal situation within the range of the monitored functions requiring a response, the routine concludes at step 72, where the program control is returned to step 60 for another cycle of system monitoring operation.

If there has been a security event that triggered any of the various system sensors as determined at step 70, the routine proceeds to step 74 for the initiation of the alarm function corresponding to the nature of the triggering event. After the conclusion of the alarm operation, the routine concludes at step 76 and the control returns to the starting step 60 for another cycle of monitoring program execution.

Thus, the use of the vehicle security system as outlined in FIG. 4, with incorporation of the use of a remote programming unit for implementing a wireless function-programming operation, can drastically simplify the system security function-programming operations. The cost to implement such a system is also low compared with other prior art counterparts. Essentially, the vehicle security system, having the wireless function-programming capability of the invention, employs a simple function-presetting scheme in a remote-programming unit, which can be used to actually program the security system host microcontroller to a status with security functions the user desires. After presetting the remote-programming unit, the function-programming of the security system can be done with a simple press on the control button. There is no need to remove the security system circuit module from the vehicle, no need to resort to a host computer system, and no complicated identification in the switch array to conduct. As a result, the convenience and efficiency of function-programming in the vehicle security system employing the wireless function-programming scheme of the invention can be improved to a maximum.

Thus, while the invention has been described by way of examples and in terms of the preferred embodiment, it is to be understood that the invention is not necessarily limited thereto. On the contrary, it is intended to cover the various modifications as well as similar arrangements included within the spirit and scope of the appended claims. The scope of the appended claims should be accorded the broadest possible interpretation to encompass all such modifications and similar structures.

While the best mode for carrying out the invention has been described in detail, those familiar with the art to which this invention relates will recognize various alternative designs and embodiments for practicing the invention as defined by the following claims.

What is claimed is:

1. A remote programmer for downloading at least one user selectable command string to a base microcontroller via a wireless link, said remote programmer comprising:

plurality of user selectable switches, each of the user selectable switches capable of being switched to either an on state or an off state;

a controller in connection with said user selectable switches, to monitor the on and off states of the user selectable switches;

in combination said user selectable switches defining at least one said user selectable command string, said string transmitted to said base microcontroller, to program said string representing user selected functions in a memory associated with said base microcontroller when said base microcontroller is in a learn mode; and an electromagnetic signal transmitter connected to the controller to transmit said command string remotely to said base microcontroller, wherein the base microcontroller determines whether or not a function-programming request code is received, wherein the base microcontroller implements a function-programming operation to initiate an alarm signal in response to the function-programming request code, wherein the base microcontroller stores said user selected functions in an electrically erasable-programmable read-only memory (EEPROM), wherein the base microcontroller determines whether a security event has occurred in a default system monitoring operation if the function-programming request code is not received by the base microcontroller, and wherein the base microcontroller initiates an alarm function in response to a determination that a security event has occurred.

2. The remote programmer of claim 1, further comprising at least one of visual and audible feedback signals acknowledging receipt of said command string.

3. The remote programmer of claim 1, wherein said base microcontroller is a part of a vehicle security system, said transmitted command string being used by the vehicle security system for application of a function-programming command.

4. The remote programmer of claim 1, wherein said based microcontroller is a part of a keyless entry system.

5. The remote programmer of claim 1, wherein said base microcontroller is a part of a user convenience system.

6. The remote programmer of claim 1, wherein said base microcontroller is a part of a vehicle security system, said base microcontroller controlling a starter interrupter and at least one of visual and audible feedback signals produced by a light and an auditory alarm device.

7. The remote programmer of claim 1, further comprising a communication interface connected to said controller allowing a printer to print at least one said command string.

8. The remote programmer of claim 1, further comprising a communication interface connected to said controller allowing a data logger to store and output at least one said command string.

9. The remote programmer of claim 1, further comprising at least one output unit connected to said controller.

10. The remote programmer of claim 9, wherein at least one of the output units is an auxiliary output unit activating a radio transmitter capable of sending at least one signal indicative of the location of the vehicle.

11. A method of remotely programming a base microcontroller by transmitting at least one user selectable command string from a remote programmer, said method comprising the steps of:

defining at least one said user selectable command string via a plurality of user selectable switches in a programmer unit;

placing said base microcontroller in a learn mode;

transmitting said command string to said base microcontroller, to program said string representing user selected functions in a memory associated with said base microcontroller when said base microcontroller is in the learn mode, wherein the base microcontroller determines whether or not a function-programming request code is received, wherein the base microcontroller implements a function-programming operation to initiate an alarm signal in response to the function-programming request code, wherein the base microcontroller stores said user selected functions in an electrically erasable-programmable read-only memory (EEPROM), wherein the base microcontroller determines whether a security event has occurred in a default system monitoring operation if the function-programming request code is not received by the base microcontroller, and wherein the base microcontroller initiates an alarm function in response to a determination that a security event has occurred.

12. The method of claim 11, further comprising the step of producing at least one of visual and audible feedback signals acknowledging receipt of said command string.

13. The method of claim 11, wherein said base microcontroller is a part of a vehicle security system.

14. The method of claim 11, wherein said base microcontroller is a part of a keyless entry system.

15. The method of claim 11, wherein said base microcontroller is a part of a user convenience system.

16. The method of claim 11, wherein said base microcontroller is a part of a vehicle security system, said base microcontroller controlling a starter interrupter and at least one of visual and audible feedback signals produced by a light and an auditory alarm device.

17. The method of claim 11, further comprising the step of printing at least one said command string via a communication interface connected to said controller.

18. The method of claim 11, further comprising the step of storing at least one said command string in a data logger connected to said controller via a communication interface.

19. The method of claim 11, wherein said programmer further comprises at least one output unit.

20. The method of claim 11, further comprising the steps of activating a radio transmitter capable of sending at least one signal via at least one output unit, said signal indicative of the location of the vehicle.

* * * * *